United States Patent
Giesenberg et al.

[11] Patent Number: 5,533,433
[45] Date of Patent: Jul. 9, 1996

[54] LOCKING ASSEMBLY IN A LAUNCHER FOR MISSILES

[75] Inventors: Peter Giesenberg, Salem; Rolf Stadler, Überlingen; Wilfried Lang, Koblenz, all of Germany

[73] Assignee: Bodenseewerk Geratiteschnik GmbH, Uberlingen/Bodensee, Germany

[21] Appl. No.: 379,623

[22] PCT Filed: Jul. 30, 1993

[86] PCT No.: PCT/EP93/02044

§ 371 Date: Mar. 28, 1995

§ 102(e) Date: Mar. 28, 1995

[87] PCT Pub. No.: WO94/03364

PCT Pub. Date: Feb. 17, 1994

[30] Foreign Application Priority Data

Aug. 3, 1992 [DE] Germany .......................... 92103693 U

[51] Int. Cl.⁶ .......................................... F41F 3/04
[52] U.S. Cl. .......................................... 89/1.806; 89/1.812
[58] Field of Search .................. 89/1.806, 1.807, 89/1.812, 1.819, 1.53, 1.54, 1.58, 1.59

[56] References Cited

U.S. PATENT DOCUMENTS

| | | | |
|---|---|---|---|
| 2,422,660 | 6/1947 | Elder et al. | 89/1.807 |
| 2,938,431 | 5/1960 | Dixon | 89/1.806 |
| 3,040,629 | 6/1962 | Duncan et al. | 89/1.806 |
| 3,983,785 | 10/1976 | Dissmeyer et al. | 89/1.812 |
| 4,519,291 | 5/1985 | Seeger et al. | 89/1.806 |
| 4,685,377 | 8/1987 | Mace et al. | 89/1.54 |
| 4,870,885 | 10/1989 | Grosselin et al. | 89/1.806 |
| 4,922,799 | 5/1990 | Bartl et al. | 89/1.806 |
| 5,094,140 | 3/1992 | Williams | 89/1.806 |
| 5,098,236 | 3/1992 | Fischer | 89/1.806 |
| 5,291,820 | 3/1994 | Hainsworth et al. | 89/1.806 |

*Primary Examiner*—Michael J. Carone
*Assistant Examiner*—Theresa M. Wesson
*Attorney, Agent, or Firm*—Dougherty, Hessin, Beavers & Gilbert

[57] ABSTRACT

A locking unit for a missile launching device comprises a pivoting pawl. The pawl has two locking lugs to clamp a shoe on the missile. The pawl is preloaded by a spring towards a locking position in which the shoe of the missile is held by the lugs. A locking lug on the pawl co-operates with a safety pawl against which the locking lug bears in the locked position. The pawl is thus held in the locked position in which the shoe is gripped by the lugs. A safety pin can be fitted through a housing of the locking unit with the pawl in the locked position. This provides a check whether the system has been properly fitted and the pawl is in the correct position. To prevent errors during this check, there is a connecting link on the pawl projecting into the path of the safety pin if the pawl is not in its proper locking position.

11 Claims, 8 Drawing Sheets

LOCKING ASSEMBLY IN A LAUNCHER FOR MISSILES

Locking Assembly in a Launcher for Missiles The invention relates to a locking assembly in a launcher for missiles, comprising a pivotally mounted blocking latch, which is provided with two blocking lugs which have the function of extending, in a blocking position, over a shoe provided on the missile, a spring by which the blocking latch is biased towards its blocking position, a locking lug provided on the blocking latch and a safety latch which is engaged by the locking lug in the blocking position, if acceleration forces act on the blocking latch, whereby the blocking latch is retained in its blocking position, and a safety pin, which, in the blocked state of the blocking latch, can be pushed through a housing of the locking assembly and which is engaged by the blocking latch.

Missiles, in particular target tracking rockets, are held in launchers, which, for example, are attached to an aircraft. In these launchers, they are retained by blocking latches against unintentional sliding-out. These blocking latches extend over a shoe, which is provided at the missile. The blocking latch is supported with a locking lug on a safety latch. When the missile is fired, the safety latch is pushed down by an electro-mechanical device. Such locking assemblies in launchers are in practical use. Now it has been found, that occasionally missiles slide out of the launcher. This can lead to very dangerous situations.

GB-A-2,133,865 shows a locking assembly in a launcher for missiles with a pivotally mounted blocking latch, which, with two blocking lugs extends over a shoe provided at the missile. The blocking latch is biased by a spring towards a blocking position, in which the shoe of the missile is retained by the blocking lugs. A locking lug is provided at the blocking latch. A blocking device engages the locking lug in the blocking position. According to GB-A-2,133,865, the blocking device is a toggle lever mechanism which is arranged to be released by a computer after a predetermined time and then releases the locking lug. Then the blocking latch is able to give way under the action of the thrust of a solid-fuel rocket motor of the missile and releases the shoe. Thereby, part of the fuel is burnt during the firing of the missile depending on altitude and speed of the carrier aircraft, in order to prevent the missile, under certain conditions, from being accelerated to excessive speed.

FR-A-1,258,098 shows a launcher wherein a blocking latch for a missile is unlocked by an unlocking member which extends into the jet of the missile.

It is the object of the invention to reduce the risk of unintentional sliding-out of the missile out of the launcher.

The invention is based on an investigation of the causes of such malfunctioning of the blocking latch.

After the missile has been set in and the missile is retained by means of the blocking latch, the loading team inserts the safety pin. It is assumed, that then, when the pin can be inserted without resistance, the blocking latch is properly locked in position and safely extends over the shoe of the missile. Actually, however, in the prior art locking assembly there is a position of the blocking latch, in which the safety pin can be inserted without problems, though the blocking latch does not properly extend around the shoe of the missile.

When the blocking latch is lifted according to the regulations during loading, the locking lug is located above the safety latch. If then the missile is inserted into the launcher with too much impetus, it may happen that the front blocking lug of the blocking latch is lifted by the missile and rests on the shoe of the missile.

With this faulty loading, jamming of the blocking latch may occur. The rear blocking lug remains in its lifted position. With such a position of the blocking latch, the missile may slide out of the launcher towards the front or towards the rear. In spite of this faulty loading the safety pin can be pushed in and simulates correct loading.

It can also happen, that the missile is not pushed forward sufficiently far during the loading, whereby the shoe of the missile does not engage the front blocking lug of the blocking latch. Then the rear blocking lug of the blocking latch rests on the shoe of the missile, after the blocking latch has been lowered. Also in such a case, the prior art blocking latches permit the safety pin to be inserted without problems.

Based on this discovery, according to the invention the object mentioned hereinbefore is achieved in that a contact surface is provided on the blocking latch and extends into the path of the safety pin, if the blocking latch is not in its correct blocking position.

An embodiment of the invention is described in greater detail hereinbelow with reference to the accompanying drawings.

A locking assembly in a launcher for missiles contains a blocking latch 10. The blocking latch is a complex casting. The blocking latch is pivotally mounted with an elongated hole 12 on a housing-fixed bearing pin 14. The blocking latch 10 is provided with two blocking lugs 16 and 18 for engaging a shoe 22 provided at the missile 20. The blocking latch is biased by a spring 24 towards a locking position, in which the shoe 22 of the missile 20 is locked. In this state, the bearing pin 14 engages a first, upper end of the elongated hole 12. Furthermore, the blocking latch 10 has a locking lug 26. A transverse piece 28 is integral with the locking lug 26. This transverse piece 28 engages a safety latch 30. The safety latch 30 prevents rotation of the blocking latch 10, if, for example, the shoe 22 of the missile 20 pushes to the left in FIG. 1 due to inertial forces and might overcome the force of the spring 24. Prior to the firing of the missile 20, this safety latch 30 will be swung downwards.

Figure 1:
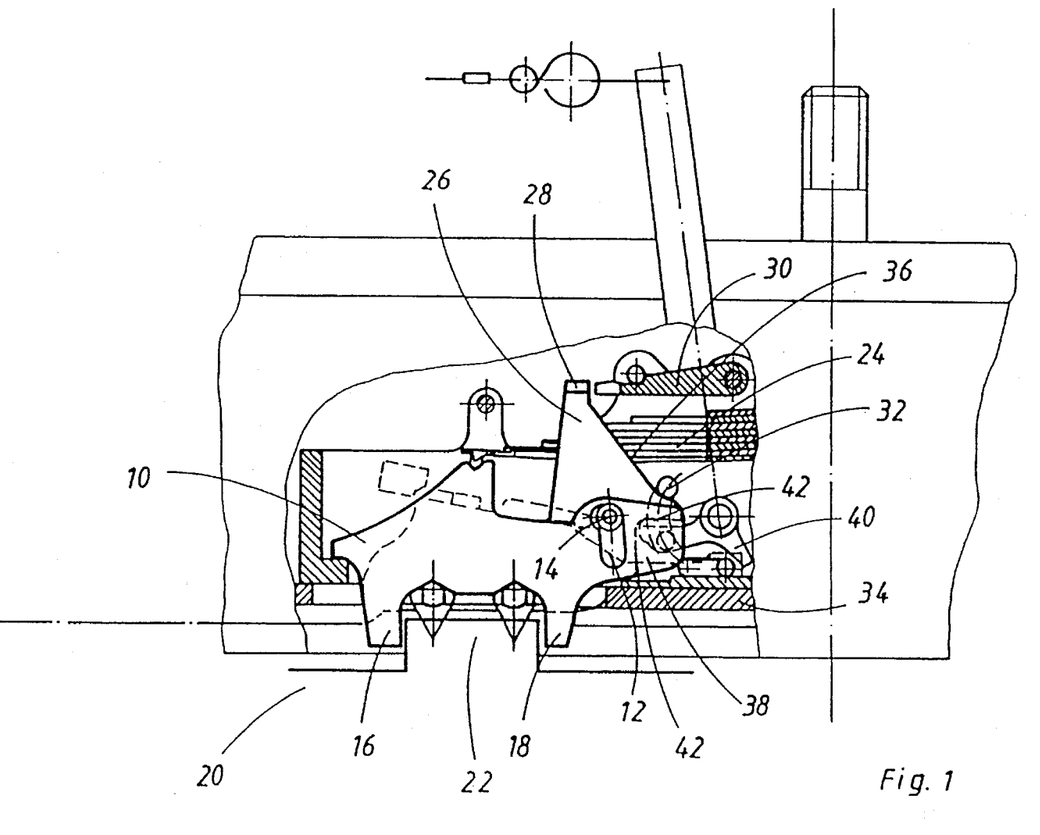
FIG. 1 illustrates a locking assembly in a launcher for missiles in its normal locking position.

Furthermore, the locking assembly contains a safety pin 32, which, in the locked state of the blocking latch 10 can be pushed through a housing 34 of the locking assembly and which is engaged by the blocking latch with a surface 36. A contact surface 38 is provided at the blocking latch 10, this surface extending into the path of the safety pin 32, if the blocking latch 10 is not in its correct blocking position.

Numeral 40 designates a positioning lever which, by means of a loading key, permits the blocking latch to be rotated counter-clockwise from a locking position to a loading position, in order to load the missile 20 into the launcher. To this end, the positioning lever engages a lug 42 of the blocking latch 10.

Figure 2:
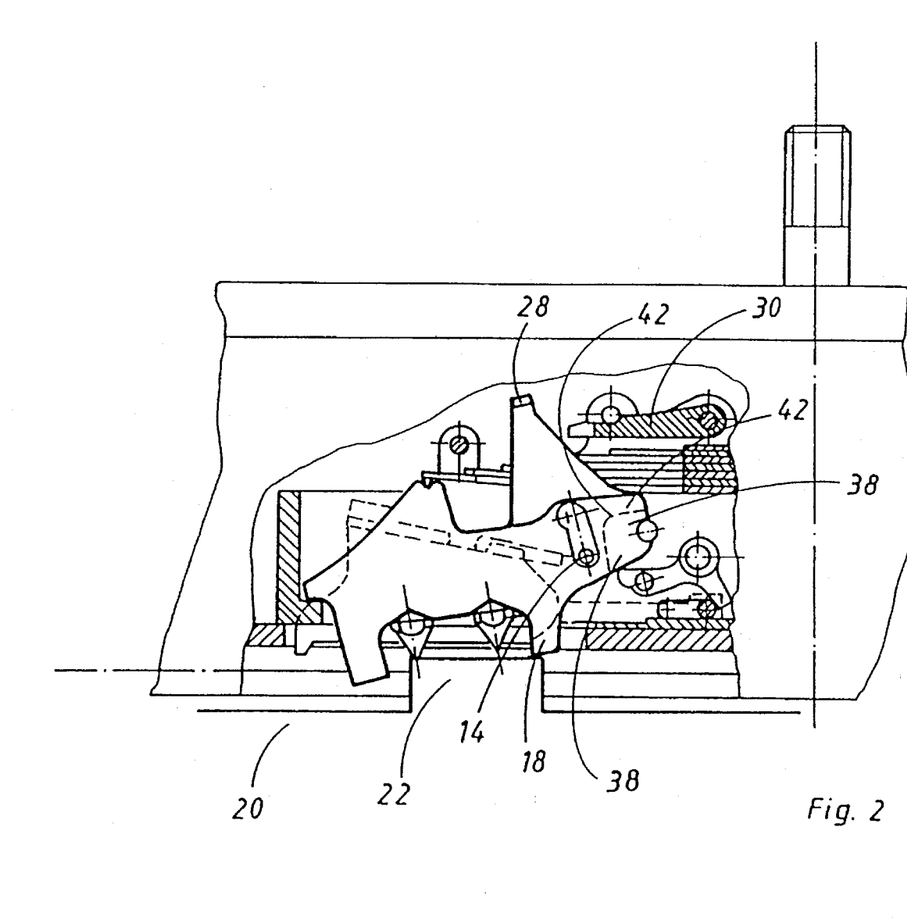
FIG. 2 illustrates the locking assembly in a faulty position.

The described assembly operates as follows:

In order to load the missile 20 into the launcher, the blocking latch 10 is rotated counter-clockwise, as viewed in FIG. 1, approximately into its loading position illustrated in FIG. 2. In this loading position, the bearing pin 14 engages the second, lower end of the elongated hole 12. The missile 20 is then pushed into the launcher from the right in FIGS.

1 and 2. The shoe 22 engages the front blocking lug 16 and rotates, supported by the spring 24, the blocking latch clockwise into the locking position illustrated in FIG. 1. The positioning lever 40 is returned to its initial position. Then the transverse part 28 is located in front of the safety latch 30, which prevents further rotation of the blocking latch 10. Then the safety pin 32 is pushed in. The insertion of this safety pin 32 without problems indicates to the loading team that the blocking latch 10 has been properly locked in position.

For the firing of the missile 20, the safety latch 30 is swung down. Then the blocking latch 10 is held in its blocking position (FIG. 1) by the spring 24 only. When the missile 20 is fired, the blocking lug 16 is pushed aside by the thrust of the missile 20 against the action of the spring 24, and the blocking latch 10 is rotated clockwise. Thereby the missile 20 is released.

With a prior art locking assembly, the contact surface 38 is not provided. The contour of the blocking latch 10 follows the dashed line 42 in Figs.1 and 2.

It may be, however, that the blocking latch 10 and the missile 20 with the shoe 22 remain in the position illustrated in FIG. 2, because during loading the missile has not been pushed so far to the front, that the shoe 22 engages the blocking lug, as required of correct loading. Then the blocking lug 18 rests on the shoe 22. The transverse bolt 14 is located at the lower end of the elongated hole 12. The transverse piece 28 is not located in front of the safety latch 30. With the prior art locking assembly, the safety pin can be inserted also in this position, in spite of faulty loading. Then, however, the safety pin 32 does not engage the surface 36, as required, but the lug 42 of the blocking latch 10. It is then possible that the missile, due to inertial forces, slides out of the launcher at the rear during the start of the aircraft.

Faulty loadings can, above all, be caused in that the missile is inserted into the locking assembly with too much impetus. It may then happen, that the front lug 16 of the blocking latch 10 is lifted by the shoe 22 and rests on the shoe 22. As, at the same time, also the rear lug 18 of the blocking latch 10 is lifted by means of the loading key, the blocking latch may jam in this position. With the prior art locking assembly, also in this faulty position of 10 the blocking latch 10, the safety pin can be inserted, though loading safety is not ensured.

Thus with the prior art locking assembly, the safety pin can be pushed in both cases. This simulates to the loading team proper retaining of the shoe 22 in the blocking latch.

In contrast thereto, the contact surface 38 is provided at the described locking assembly. This contact surface 38 prevents insertion of the safety pin 32 in the faulty position of FIG. 2. Therefrom, the loading team recognizes the presence of a faulty position.

Figure 3:
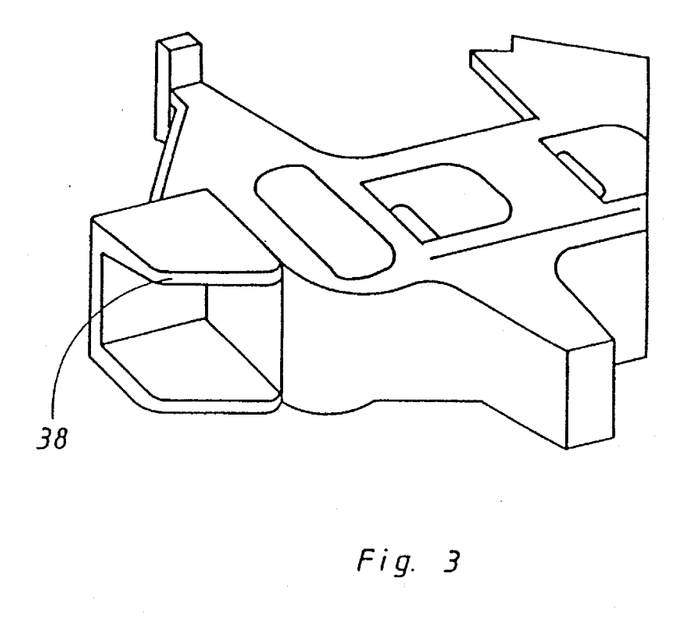
FIG. 3 is a perspective illustration of the blocking latch with the contact surface.

In the embodiment of FIG. 3, a contact surface 38 in the form of a flat projection is provided adjacent to the lug 42 outside the path of the positioning lever 40.

Figure 4:
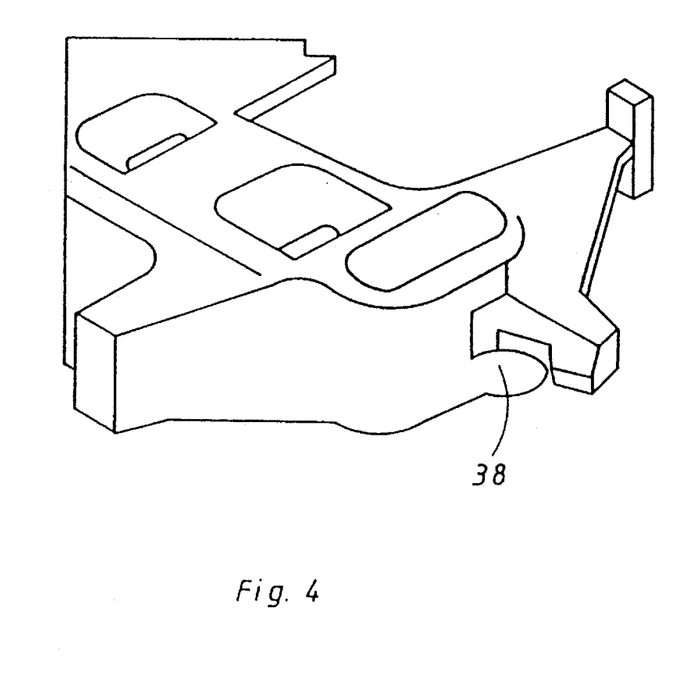
FIG. 4 is a perspective illustration of a blocking latch with a modified form of the contact surface.

As can be seen from FIG. 4, the contact surface 38 is formed by a u-profile part attached to the blocking latch 10. Such a u-profile part does not impede the function of the positioning lever. It can be connected subsequently to blocking latches already in use, for example be welded, soldered or cemented thereto, and therefore permits simple retrofitting of already present locking assemblies.

FIGS. 5 to 9 describe a further embodiment of the locking assembly. The basic structure is the same as with the embodiments of Figs.1 to 3. Corresponding elements are provided with the same reference numerals as there.

Aligned bores 46 for the safety pin are provided in the side walls 44 of the housing 34. The blocking latch 10 is located above an aperture 48 in the bottom of the housing 34. An edge of the blocking latch 10 rests on one side on the edge of the aperture 48. In the position illustrated in FIG. 5, a portion 52 is also supported on the edge of the aperture 48. Blocking lugs 16 and 18 extend through the aperture 48. A transverse bolt 14 mounted in the housing 34 extends through an elongated hole 12 of the blocking latch. In the position illustrated in FIG. 5, the transverse bolt 14 is located at the upper end of the elongated hole 12. Furthermore, a locking lug 26 is integral with the blocking latch 10, which, similar to the embodiment of FIG. 1, engages a safety latch 30 (not shown).

In the embodiment of Figs.5 to 9, a lug 54 is integral with the blocking latch 10. This lug performs a plurality of functions: The positioning lever 40 engages this lug 36 through a roller 56. Upon actuation of a loading key, the positioning lever rotates the blocking latch 10 counterclockwise into a loading position. Furthermore, however, the lug 52 is formed and arranged such that it extends into the region of the bores 46 and prevents insertion of the safety pin 32, if the blocking latch is not exactly in the locking position illustrated in FIG. 5. The lug 52 forms the surface 36 behind which the safety pin 32 can be pushed through the bores 46.

The lug 52 defines a cam surface 58 which is engaged by the positioning lever 40 when rotated by the loading key. The cam surface has a straight section 60. Adjacent to the straight section 60 is a projecting end 62 of the lug. When the positioning lever 40 is rotated clockwise, the positioning lever 40 with its roller 56 moves along the cam surface 58. Thereby the blocking latch 10 is rotated counter-clockwise, as viewed in Figs.5 to 9, about the contact point of the edge and thereby, the transverse bolt 14 in the elongated hole. The rotary movement both of the positioning lever 40 and of the blocking latch 10 are limited by the roller 56 engaging the projecting end 62 of the lug 54. This is the loading position.

The various positions are illustrated in FIGS. 5 to 9.

Figure 5:
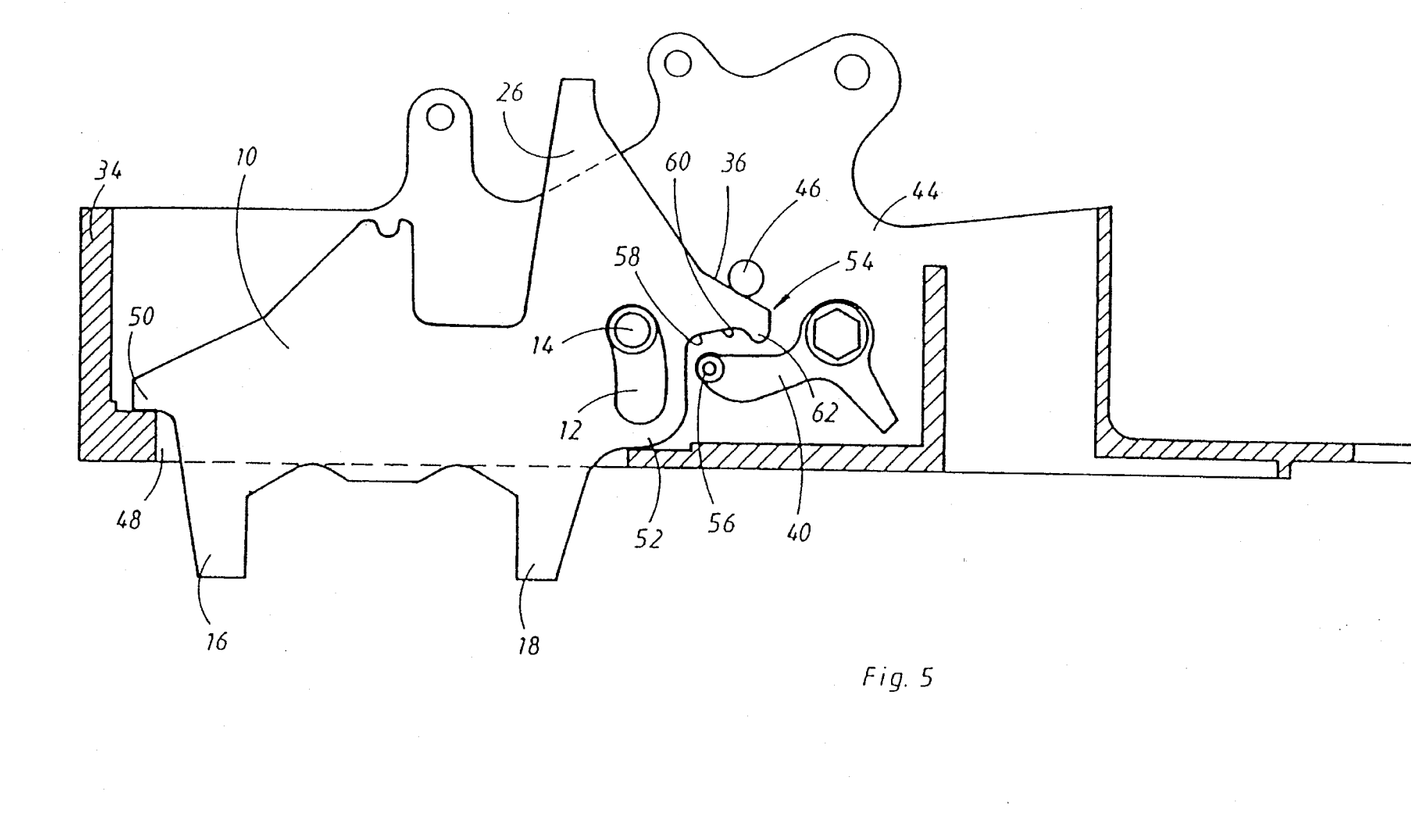
FIGS. 5 to 9 show, in various positions, a blocking latch with a further modification of the contact surface.

FIG. 5 shows the locking position. The positioning lever 40 is in its 0°-position and does not engage the blocking latch 10. In this position, and only in this position, the bores 46 are completely unobstructed, such that the safety pin 32 can be pushed therethrough. Then the area 36 is tangential to the cross section of the bores 46, as viewed in the side elevation of FIG. 5.

Figure 6:
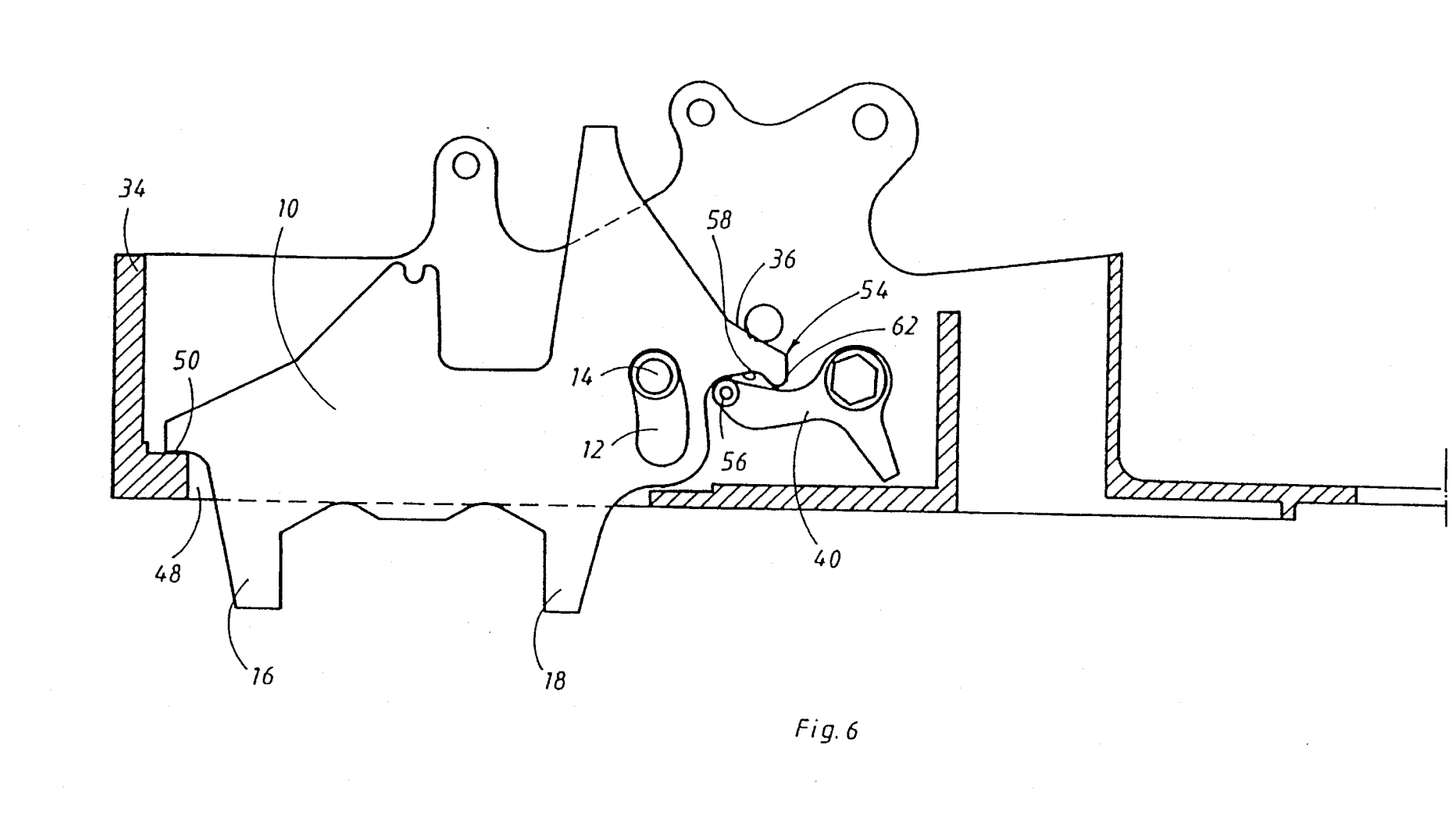

FIG. 6 shows the state, after the positioning lever 40 has been rotated clockwise through an angle of 10°. Then the roller 56 just engages the cam surface 58. Then the roller 56 engages the lefthand end, as viewed in FIG. 6, of the straight section 60. The end 62 of the lug 54, which end projects downwardly in FIG. 6 towards the positioning lever 40, extends just so far that, in this position, it ends just above the positioning lever 40.

Figure 7:
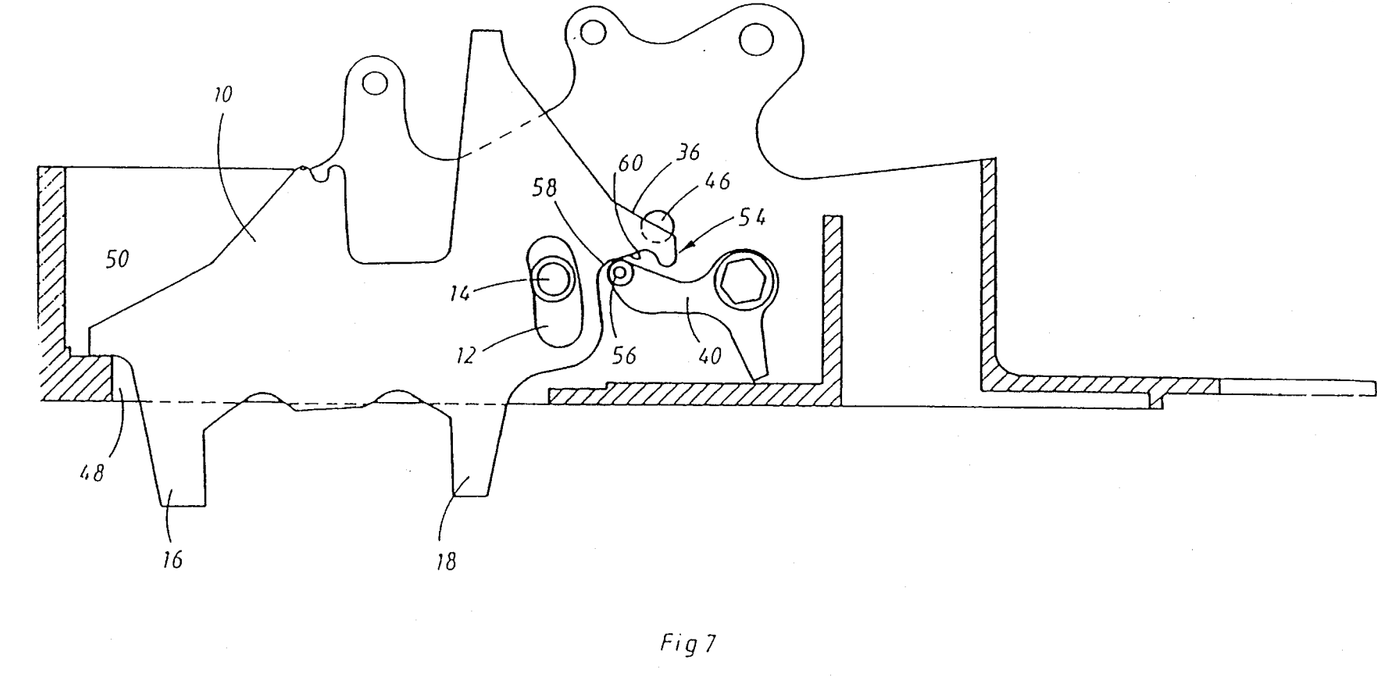

Upon further clockwise rotation of the positioning lever 40, as viewed in FIG. 6, the blocking latch 10 is rotated counter-clockwise about the contact point of the edge. This is illustrated in FIG. 7 for an angle of rotation of the positioning lever 40 of 20°. The transverse bolt slides in the elongated hole 12. The roller 56 moves along the straight section 60 of the cam surface to the right in FIG. 7. Thereby, the lug 54 with the surface 36 extends over the bores 46. Now it is no longer possible to push the safety pin 32 through the bores 46.

Figure 8:
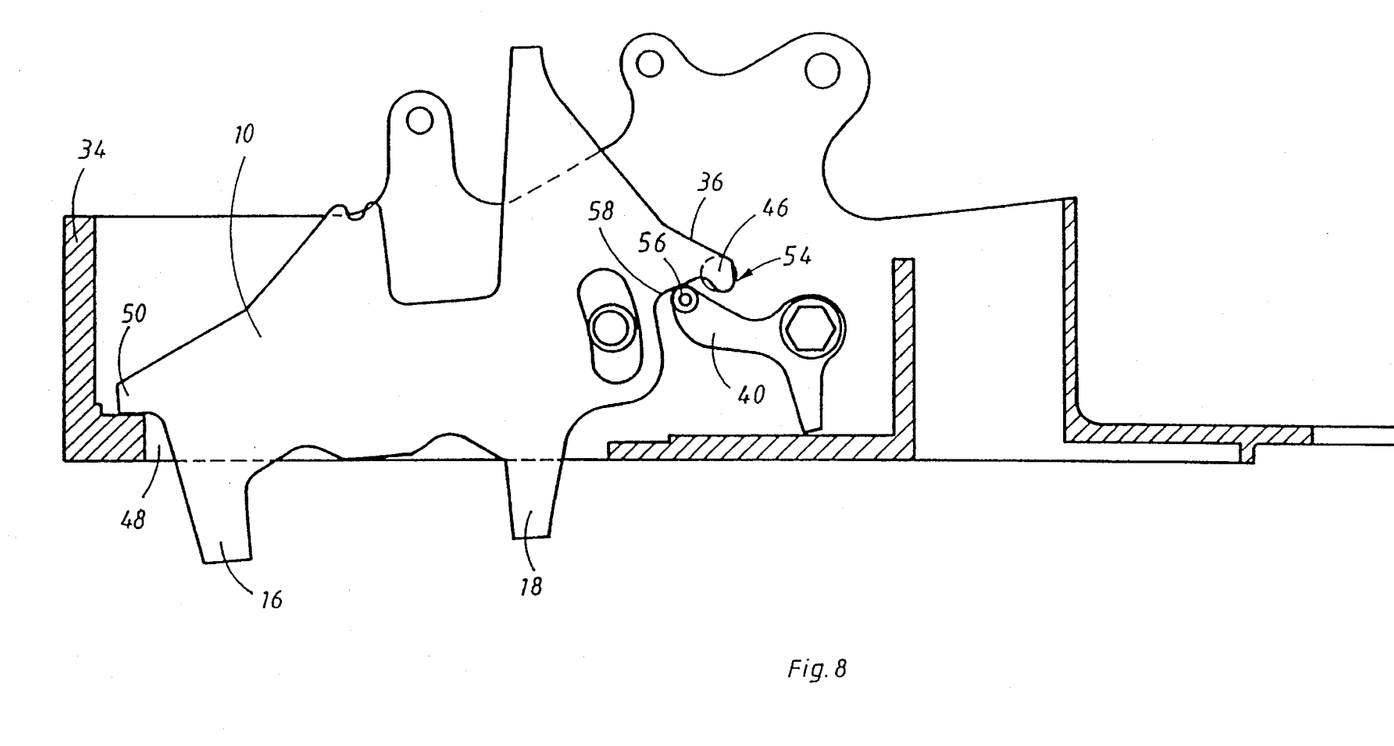

FIG. 8 illustrates the state, after the positioning lever 40 has been rotated through 30°. Thereby, the bores 46 are virtually completely covered by the lug 54. The roller 56 has moved further to the right in FIG. 8 along the cam surface 58.

Figure 9:
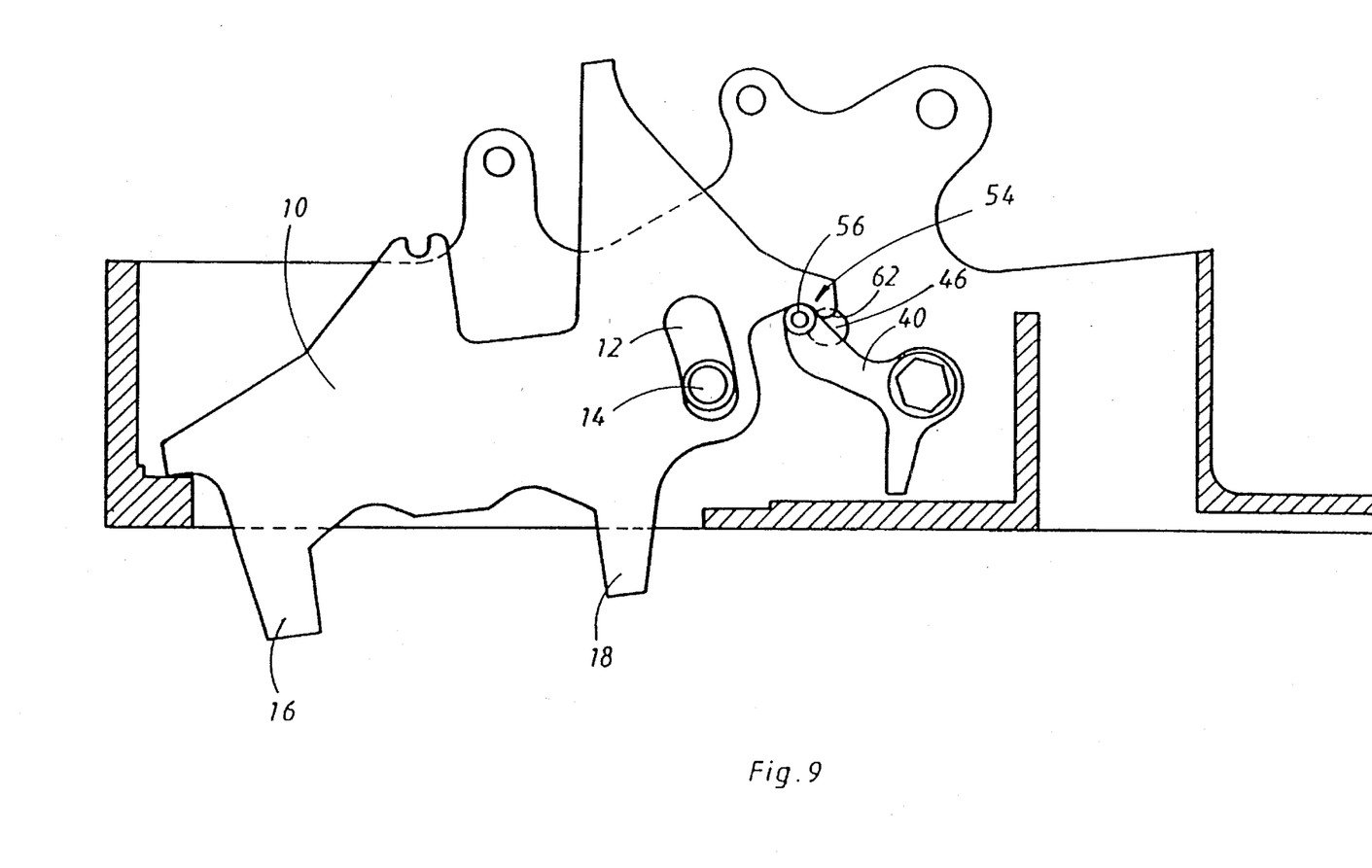

FIG. 9, finally, shows the loading position at an angle of rotation of the positioning lever 40 of 44°. Then the roller 56 engages the projecting end 62. Thereby the projecting end 62 acts as travel limit which limits the travel of the roller 56. Thereby, also the counterclockwise rotary movement, as viewed in FIG. 9, of the blocking latch 10 is limited. In this position, the transverse bolt 14 is still spaced a small distance from the lower end, as viewed in FIG. 9, of the elongated hole 12. Thus limiting of the rotary movement is not effected by the transverse bolt 14 and the elongated hole 12.

As can be seen from FIG. 9, the end 62 of the lug still extends a slight distance into the cross section of the bore 46. Also in this end position it is not possible to insert the safety pin 32 (FIG. 1).

We claim:

1. A locking assembly in a launcher for missiles, comprising
   (a) a pivotally mounted blocking latch, which is provided with two blocking lugs for extending over a shoe provided on the missile,
   (b) a spring by which the blocking latch is biased toward a blocking position, in which the shoe of the missile is retainable by the blocking lugs,
   (c) a locking lug provided on the blocking latch and a safety latch which is engaged by the locking lug in the blocking position, whereby if acceleration forces act on the blocking latch the blocking latch is retained in the blocking position, and
   (d) a safety pin, which, in the blocking position of the blocking latch, can be pushed through a housing of the locking assembly and engaged by the blocking latch, wherein
   (e) a contact surface is provided in the blocking latch and extends into the path of the safety pin if the blocking latch is not in a correct blocking position.

2. The locking assembly as claimed in claim 1, wherein
   (a) the blocking latch is arranged in a housing, which has a bottom provided with an aperture, and is supported with an edge portion on the bottom adjacent to the aperture,
   (b) the blocking lugs extend through the aperture in the bottom, and
   (c) the blocking latch has an elongated hole therethrough, through which a transverse bolt mounted in the housing extends.

3. The locking assembly as claimed in claim 2, wherein in a loading position, the transverse bolt is spaced from a bottom side of the elongated hole.

4. The locking assembly as claimed in claim 1, wherein the contact surface is formed by a separate component and is connected to the blocking latch by material connecting means.

5. The locking assembly as claimed in claim 4, wherein the material connecting means is a welding connection.

6. The locking assembly as claimed in claim 4, wherein the material connecting means is a soldering connection.

7. The locking assembly as claimed in claim 4, wherein the material connecting means is a cementing connection.

8. The locking assembly as claimed in claim 1, wherein the contact surface is a u-profile part attached to the blocking latch.

9. The locking assembly as claimed in claim 1, wherein
   the blocking latch is arranged to be rotated from the blocking position to a loading position by a positioning lever non-positively engaging a cam surface of the blocking latch, the end of the positioning lever engaging the cam surface and moving along the cam surface during the rotary movement; and
   the cam surface of the blocking latch forms a travel limit by which the movement of the positioning lever along the cam surface and, thereby, the rotary movement of the blocking latch, is limited.

10. The locking assembly as claimed in claim 9, wherein the contact surface is a lug provided at the blocking latch, wherein the contact surface
    defines a surface on a first side thereof which is engageable by the safety pin; and
    defines the cam surface on a second side opposite the first side, the cam surface ending in a projecting end defining the travel limit.

11. A locking assembly as claimed in claim 10, wherein in the loading position, the transverse bolt is spaced from a bottom side of an elongated hole.

* * * * *